Feb. 11, 1947. S. S. POKORNY 2,415,759
COMBINATION PICK-UP LOADER AND STACKER
Filed March 2, 1942 3 Sheets-Sheet 2
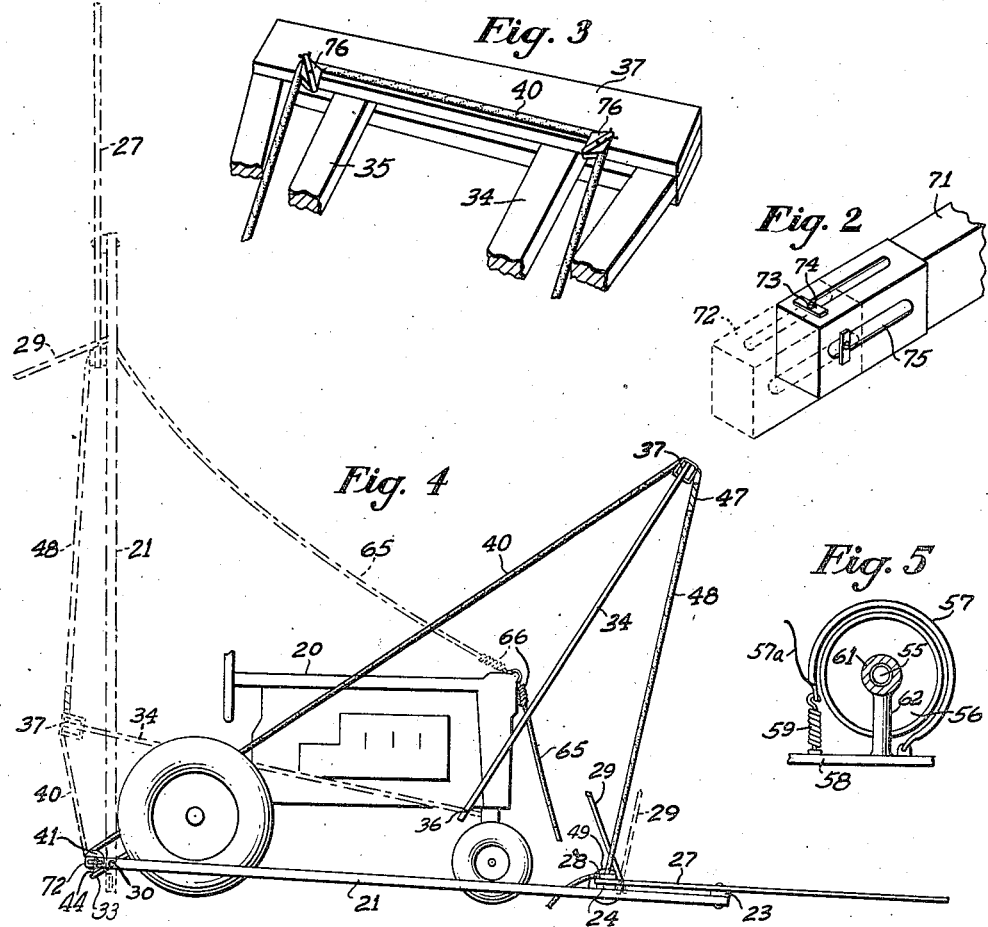
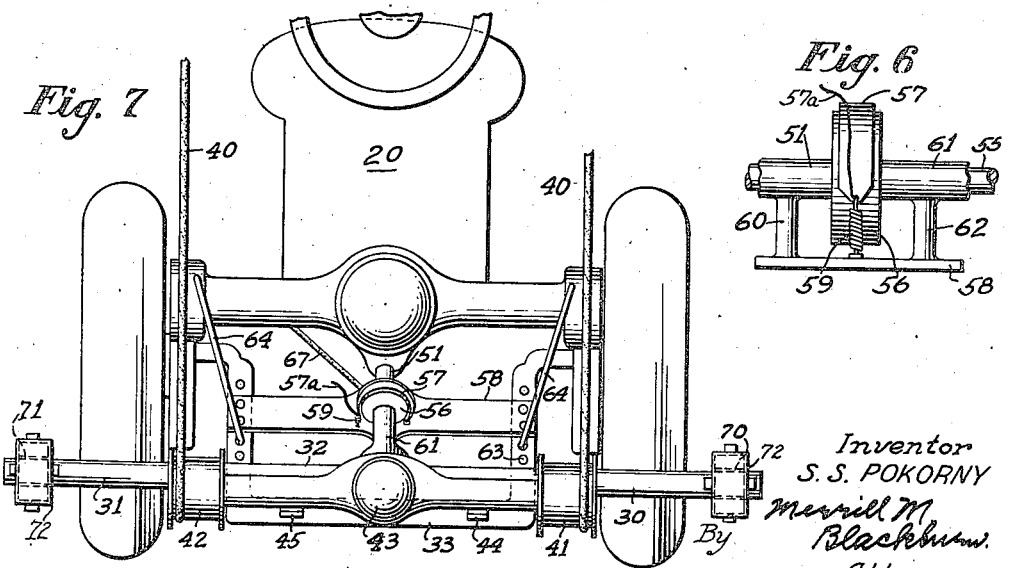
Inventor
S. S. POKORNY
Merrill M Blackburn
By Attorney Feb. 11, 1947. S. S. POKORNY 2,415,759
COMBINATION PICK-UP LOADER AND STACKER
Filed March 2, 1942 3 Sheets-Sheet 3
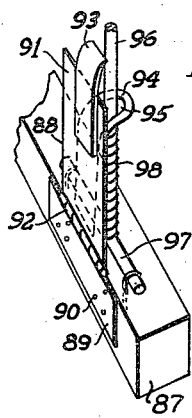
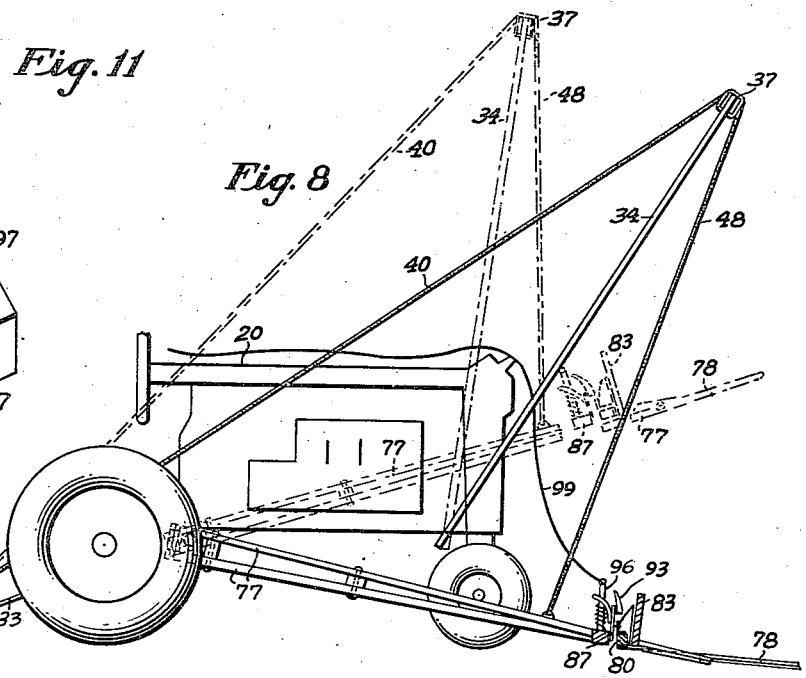
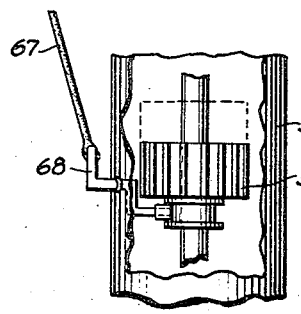
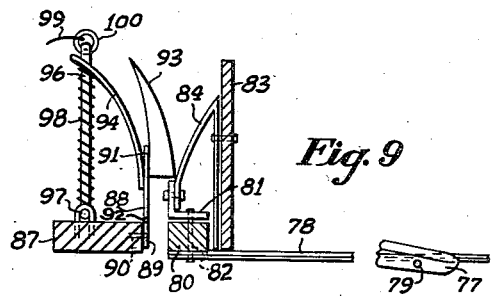
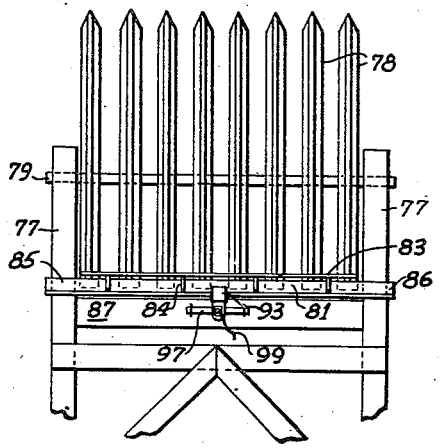
Inventor
S. S. POKORNY
By Merrill M. Blackburn
Attorney Patented Feb. 11, 1947

2,415,759

UNITED STATES PATENT OFFICE 2,415,759

COMBINATION PICKUP LOADER AND STACKER

Stephen S. Pokorny, Humboldt County, Iowa

Application March 2, 1942, Serial No. 433,090

9 Claims. (Cl. 214—131)

This invention relates to hoisting mechanism and is concerned more specifically with structure adapted to serve either as a loader or as a stacker.

Formerly it was the practice, after a field of hay had been cut and raked into windrows, to load the hay into hay-racks. This was done either by hand with pitch forks or by attaching a revolving, inclined apron type elevator or loader to the rear of the hay rack. In the latter case the team of horses pulling the hay rack were driven down the windrow, one on each side thereof, with the hay rack and loader trailing. As the loader dropped all of the hay in the rear end portion of the rack it was necessary to manually pitch the hay from the rear of the rack to the front in order to obtain an even load. When a full load had been obtained the loader was uncoupled from the rack and the rack driven to the point at which the hay was to be deposited whether that was in a distant barn or in a stack in the very field from which the hay was being taken. Since tractors have in the main replaced horses on the form this type of hay-loading equipment has become increasingly unsatisfactory for the reason that tractors with narrow front wheels pack the hay into the ground as the tractor travels along straddling the windrow. Offset hitches enabling the tractor to be driven to one side of the windrow have not proven highly satisfactory. As substitutes for the trailer type hay loader various constructions have been proposed, most of which are adapted to be mounted directly upon a tractor and to have their hay gathering unit disposed in front of the front wheels of the tractor. The hay gatherer or pick-up normally comprises a multiplicity of elongated wooden teeth extending in the same general direction as the tractor and suitably secured together in spaced apart relationship. Some means must, of course, be provided for raising the loaded hay pick-up and the common practice is to provide on the front end portion of the tractor a generally upright, fixed standard structure to support the pick-up or fork and its load as they are being raised. Provision is usually made for selectively permitting the outer ends of the teeth of the fork to swing downwardly to a limited extent when the load is in elevated position over the place of deposit in order that the hay may slide from the fork. If desired such devices may be used to originally rake the hay rather than to just pick it up from a windrow. While constructions of this type which are now available have certain advantages they also have certain limitations. For one thing it is necessary to first raise the fork and to then drive with the load in elevated position up to the depository which in the case of a substantially completed hay stack may require the load to be at approaching maximum height. Obviously very material strain is thus applied to the structure. Again in loading a hay rack it is impossible to pull the rack with the tractor to any advantage. Rather it is necessary to permit the rack to remain stationary and to drive about at a distance from it until a fork load of hay has been picked up. Then the operator drives back to the rack and, after the fork has been raised, drives up so that the load is over the rack after which he releases the support for the outer ends of the fork teeth permitting the hay to fall into the rack.

I have invented a novel rake-stacker in which I have overcome a number of the objections to stackers and loaders heretofore available. In general my device includes two elongated beam members extending in the same direction as the tractor and disposed one on each side thereof. The rear end portions of said beam members are suitably pivotally mounted to the rear of the rear wheels of the tractor. Supported on the front end portions of the beam members is a broad flat fork structure comprising a multiplicity of forwardly extending teeth. Pivotally mounted, adjacent an end of each, upon the forward portion of the frame of the tractor and to each side thereof are two other beam members adapted to extend forwardly and upwardly from the tractor when the fork is adjacent the ground and having cross bar structure connecting together their upper ends. Extending downwardly and rearwardly from the cross bar structure of latter said beams are segments of flexible cable adapted to have their lower ends operatively attached to rotatable drums which in turn are connected to the power take-off of the tractor. Other cable connects the aforesaid cross bar structure to the fork which, as heretofore mentioned, is secured to the first described beam members. Application of power to the rotatable drums causes the second mentioned pair of beam members to rotate upon their pivots and these in turn cause the first mentioned pair of beams to rotate upon their pivots whereby the first mentioned pair of beams and the fork attached thereto are raised into substantially a vertical plane behind the tractor. It is thus seen that with my novel construction the hay upon the pick-up fork is deposited to the rear of the tractor.

It is an object of my invention to provide a novel machine for picking up a load from the ground or other surface and depositing it in or upon an elevated depository.

Another object of my invention is to provide such a device in which the load is picked up in front of the vehicle carrying the device and deposited to the rear of said vehicle.

Another object of my invention is to provide a loader equipped with a plurality of elongated frame structures each pivotally mounted, adjacent one of its end portions, upon a vehicle, one of said frames being adapted to carry the load and the other being adapted to change the direction of application of power from the power source whereby a lifting or upward force is exerted upon said load carrying frame.

Yet another object of this invention is to provide in a mounted loader a novel combination of parts for transmitting the power which raises the load.

A further object of this invention is to provide a device of the class described in which the load may be halted at any point in its upward journey and effectively there supported.

Still another object is to provide a loader in which the load may be substantially completely on one side of the carrying fork without impairing the operation of the device.

An additional object of my invention is to provide a novel process for loading material.

Another object is to provide a novel process for stacking material.

A still further object of this invention is to provide in a loader designed for forward delivery an elongated frame structure pivotally mounted adjacent one of its end portions upon a vehicle and adapted to change the direction of application of the load raising power.

In order that a more clear and concise understanding of my invention may be had reference should be made to the accompanying drawings forming a part of this specification in which Fig. 1 is a top plan view of a loader embodying one form of my invention.

Fig. 2 is an enlarged perspective view of an optional construction for the rear ends of the beams of the main frame structure.

Fig. 3 is a perspective view of a fragment of the top portion of the secondary frame showing a modified construction.

Fig. 4 is a side elevational view of the structure shown in Fig. 1 with the discharge position of the various members being shown in dotted lines.

Fig. 5 is a view partially in cross section and partially in end elevation taken on line 5—5 of Fig. 1.

Fig. 6 is a side elevational view of Fig. 5.

Fig. 7 is a rear end elevation of Fig. 1.

Fig. 8 is a side elevation of a front delivery loader made in acccordance with my invention, the positions of the various parts when the load carrier is in an elevated position being shown in dotted lines and parts being broken away to clearly reveal the construction.

Fig. 9 is an enlarged side elevational view of the latch for holding the load carrier against rotating to discharge position, together with adjacent parts, the supporting beam being shown only fragmentarily.

Fig. 10 is an enlarged top plan view of the load carrier.

Fig. 11 is an enlarged perspective view of the principal portion of the latch structure showing the same in greater detail.

Figure 12 is a fragmentary plan view of a portion of the windlass drive train, a portion of the housing being broken away in order to more clearly reveal the construction.

Figure 1:
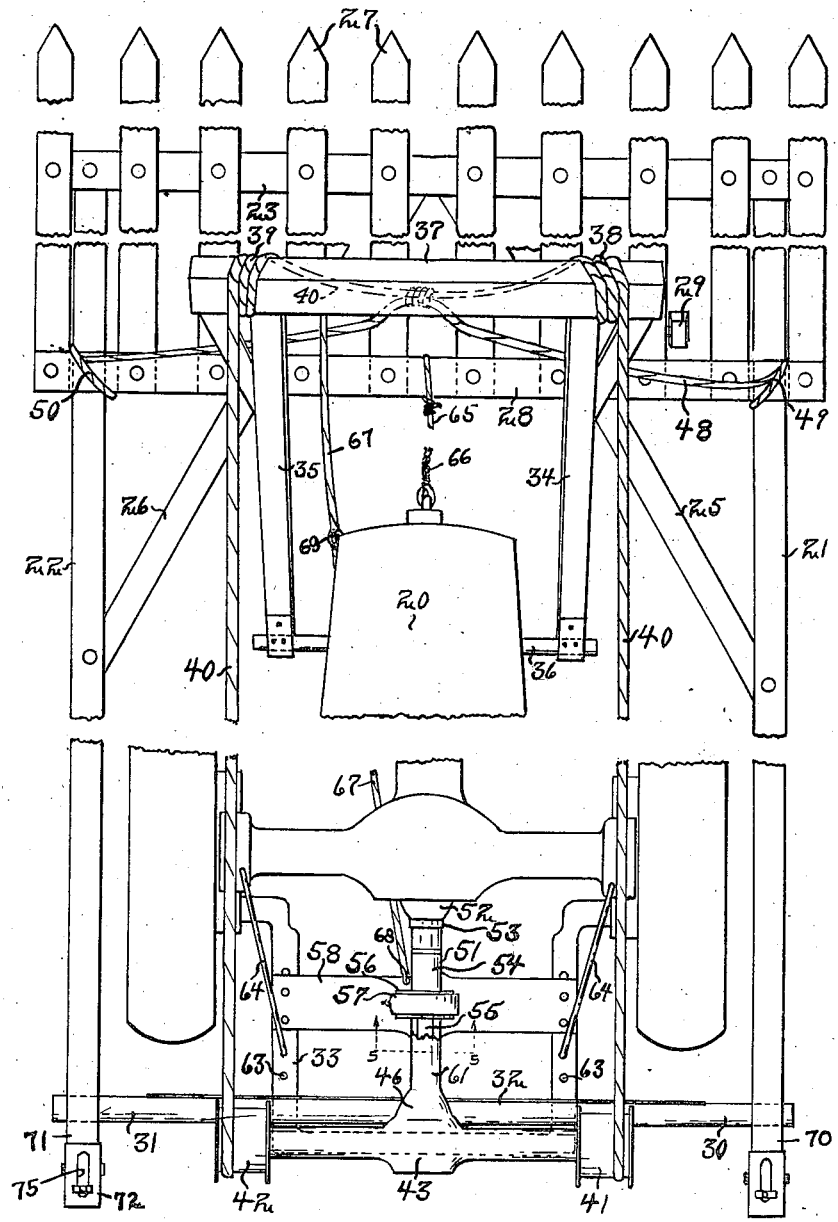

Referring now more specifically to Figs. 1–7 of the drawings I have used the numeral 20 to designate, generally, a tractor on which I have mounted my loader. On each side of the tractor and outside of the rear wheels thereof are beam members 21 and 22 which form a part of what I have referred to as the main frame. Connecting the forward ends of the beam members 21 and 22 are cross beams 23 and 24 (see Fig. 4). Braces 25 and 26 may be provided to supply additional rigidity. Extending transversely of the cross beams 23 and 24 and secured thereto are a multiplicity of teeth 27 which form a fork or pick-up. Extending across the rear ends of the teeth 27 is a cross bar 28. Pivotally mounted upon each of the teeth 27 adjacent the cross beam 24 and the cross bar 28 is an auxiliary tooth 29 (shown only in part in Fig. 1). These auxiliary teeth extend in a generally upward direction from the teeth 27, when the latter are horizontally disposed, but, as appears clearly in Fig. 4, they are normally free to incline somewhat relative to said teeth 27. Their rotation is limited in one direction by engagement of their butt ends, extending downwardly below the pivot points, with the cross beam 24 and in the other direction by engagement of portions above the pivot points with the cross bar 28. The beam members 21 and 22 are rotatably mounted, adjacent their rear ends, upon stub shafts 30 and 31. These stub shafts 30 and 31 each have their inner end portions securely welded to the angle iron 32 which is supported directly upon the draw bar 33 of the tractor 20. Other beam members 34 and 35 which form a part of the secondary frame of my device are each rotatably mounted at one end upon the shaft 36 which is supported upon the main frame of the tractor 20. Connecting the upper ends of the beams 34 and 35 is the cross beam 37. Wrapped about the cross beam 37 are sections 38 and 39 of the cable 40, the lower ends of which are operatively secured to the drums 41 and 42. The said drums 41 and 42 are mounted at each end of the differential construction 43 which in turn is supportably mounted upon the draw bar 33 by means of brackets 44 and 45 (Fig. 7). The power intake 46 of the differential 43 is operatively connected to the power take-off of the tractor 20 by means which will hereafter be more fully described. The mid-section 47 (Fig. 4) of the cable 40 is disposed to the forward side of the cross beam 37 forming a loop to which the cable 48 is attached. It is substantially the mid-section of said cable 48 which is attached to said loop and the point of attaching is approximately the center point of the loop. The end portions 49 and 50 of the cable 48 are secured about the beam members 21 and 24 and 22 and 24 respectively. Connected to the power take-off of the tractor which is situated within the general housing structure 51 at substantially the juncture 52 is a slip-clutch of any well-known type also encased by said housing 51 at 53. The connection between the slip-clutch 53 and the power take-off 52 may be in the nature of a universal joint. Operatively connected to the slip clutch 53 and also within the housing 51 an ordinary transmission may be installed at 54. On the shaft 55 connecting the transmission 54 with the power intake 46 of the differential 43 is a greatly enlarged shoulder 56. Encircling the major portion of the shoulder 56 is a flexible strap or brake shoe 57, one end of which is secured unyieldingly to the cross plate 58 of the tractor bar 33. The other end of said brake shoe 57 is attached to the upper end of a spring 59 (Figs. 5 and 6). The lower end of the spring 59 is attached to the cross plate 58. A pull cord 57a permits the operator to release the brake by raising the shoe 57. The housing 51 is supported in part on the plate 58 by means of the upstanding lug 60 and the housing 61 to the rearward of the shoulder 56 is mounted upon said plate 58 by means of the lug 62. The height of the rear ends of the beams 21 and 22 and the height of the differential 43 and its connections, may be varied by altering the particular holes 63 in the draw-bar 33 in which the hanger members 64 are inserted. Obviously rotation of the drums 41 and 42 will wrap the extended segments of the cable 49 upon said drums, thus rotating the beams 34 and 35 together with the cross beam 37 to the rearward about the shaft 36. Since the secondary frame is connected to the main or primary frame by means of the cable 48, rotation of the said secondary frame rearwardly necessarily causes rotation of the primary frame about its pivot point raising it ultimately to a nearly vertical position, such as that shown in dotted lines in Fig. 4. In order to prevent the main frame from rotating too far, a cable 65 is provided to serve as a stop. One end of said cable 65 is attached to the main frame adjacent the fork; the other end of the cable 65 is preferably attached to a tension spring 66 which in turn is secured to the tractor. The cable 65 may optionally be of V-shape having its end attached to the sides of the main frame and its center attached to the spring 66. The adjustment of the slip-clutch 53 is such, relative to the tensile strength of the cable 65, that in case the operator fails to disengage the power immediately upon the main frame reaching its limit of rotation, the slip-clutch 53 serves as a safety permitting the tractor power take-off 52 to rotate without driving the differential 43. If desired an additional safety feature may be provided in a positive automatic cut out of the power. At 67 I have shown a small cable having one end attached to the cross beam 37 and its other end secured to the lever 68 adapted to throw the transmission 54 out of gear. The central portion of the cable 67 engages the pulley 69 and the length of the said cable 67 is such that by the time the secondary frame has rotated sufficiently far to bring the main frame to its maximum desired height the said cable 67 has been tightened enough to operate the lever 68. Stub ends 70 and 71 of the beams 21 and 22 are purposely left protruding beyond the shafts 30 and 31 because when the main frame is in a substantially vertical position with a heavy load there is some tendency for certain tractors to rear up on their hind wheels. In such cases the stubs 70 and 71 engage the ground before the front wheels of the tractor have much more than left the ground and thus equalize and balance the tractor until the load has been discharged. Shoes 72 (see Fig. 2) longitudinally slidable on said ends 70 and 71 may be provided for the purpose of regulating the length of said stub ends in order that they may function to prevent rearing of the tractor regardless of the elevational setting of the draw bar 33 and stub shafts 30 and 31. Screws 73 having elongated washers 74 are slidably received in slots 75 of said shoes 72 and engage the stub ends 70 and 71 with their threaded shanks to provide means for rigidly securing said shoes 72 in extended positions.

In using my novel loader the operator drives along a windrow or, if the hay has not been raked into windrows, along the mowed field, with the main frame in a generally horizontal position, the teeth 27 being spaced but slightly from the ground, until a load has been picked up by the fork. The forward end of the main frame is supported in spaced relationship to the ground by the cable 48 and the cable 49 co-acting with the secondary frame and the differential 43. One of the features of my construction is that the placement of the load on the fork is immaterial for it may be entirely to one side and still the main frame will raise the load in its usual manner and without being twisted appreciably due to the fact that the cable 48 is of V-shape, engaging the outer edges of the main frame with its end portions and engaging a support adjacent the center of the cross beam 37 with its central portion. If the hay is being loaded into a hay rack for transportation to a distant depository the rack is continually trailed behind the tractor, connected thereto preferably by a short hitch. Whenever a sufficient load has been gathered upon the fork, it is necessary only to bring the tractor to a halt and place the differential 43 in operation by means of the power take-off 52 and the connecting power chain comprising the slip clutch 53, the transmission 54 and the shaft 55, whereupon the fork is raised in the manner heretofore described to a substantially vertical position to the rear of and above the tractor. As a matter of fact it is not essential that the tractor be brought to a halt during the loading operation except that a certain amount of the hay on the ground will be skipped over while the fork is in the air. If the fork be raised slowly, upon its reaching a nearly vertical position, the load will slide therefrom down the auxiliary teeth 29 into the front end of the hay rack. If raised more rapidly, the hay will be literally thrown rearwardly somewhat and land in the middle or rear sections of the rack, depending upon the speed at which the fork is raised. Also, in order to obtain greater rearward hurling distance, a strip of material (not shown) may be inserted between the cross bar 28 and the adjacent portions of the auxiliary teeth 29 thereby reducing the angle at which said teeth are permitted to incline to the main teeth 27 and placing them in substantially a perpendicular relationship. The spring 66 serves to absorb the shock of the sudden halting of the rotation of the primary frame and to add a degree of resiliency thereby increasing the speed at which said main frame may safely be raised and hence the distance which load may be cast. By wrapping the cable 40 about the cross beam 37 as at 38 and 39, the necessity for the said cable slipping relative to said cross beam as the secondary frame is being rotated about the shaft 36 is eliminated for the cable, being wrapped, simply unwraps somewhat and rewraps at various points of rotation of the secondary frame. Of course, if desired the cable 40 may be divided into two individual cables each having one end looped about or otherwise secured to the cross beam 37 and having the other end attached to a differential drum.

The differential 43 is provided primarily to insure against twisting of the secondary frame, as the latter is being raised, due to uneven winding or double wrapping of one of the sections of the cable 40 upon the drum 41 or 42. If relatively wide drums are employed the necessity for a differential is substantially eliminated and a straight cross shaft connected by mitre gears or otherwise to the shaft 53 may be substituted in its stead. In Fig. 3 is shown still another construction which avoids the use of a differential. Here the cable 40 is passed through a pair of spaced apart pulleys 76 securely mounted to the rear on the cross beam 37. If one of the segments of said cable 40 wraps more rapidly than the other any variation is compensated for by the cable rotating said pulleys. In such structure and others in which the cable 40 does not extend, in any part, to the forward of the cross beam 37, the cable 48 is fastened either directly or indirectly to said cross beam.

The modified form of my invention illustrated in Figs. 8 to 11 is especially adapted for use in loading heavy material such for example as farm manure. While it is not essentially so constructed, it is preferred in this front delivery type loader where great height is not required that the main frame beams 77 be mounted on the frame of the tractor inside and forward of the rear wheels as appears clearly in Fig. 8. The teeth 78, forming a scoop, are pivotally mounted relative to the frame members 77 by means of the shaft structure 79; to the rear of the teeth 78 a cross member 80 is mounted. Along the top face of the cross member 80 I have placed an angle iron 81 which together with the cross member 80 is held securely to the teeth by any suitable fastening means as at 82. A back stop 83 which serves to prevent the load from moving backwardly too far upon the scoop is held in position by means of the brackets 84 which, in turn, are attached to the angle iron 81. The ends 85 and 86 of the angle iron 81 are extended to serve as stops, by engagement with the beams 77, to limit the downward rotation of the rearward portion of the scoop. Upon a cross beam 87 extending between the beam members 77 is mounted a retractable latch structure including, in the form shown, a T hinge 88. The base 89 of the T hinge is secured by means of fasteners 90 to the forward edge of the cross beam 87 in such a manner that the retractable portion 91 of the hinge 88, pivotally secured to the base 89 at 92, extends generally upwardly from said cross beam 87. To the forward side of said rotatable portion 91, a wedge like member or suitable substitute 93 is mounted; to the rear of said portion 91 a strap 94 having an opening 95 is secured. Loosely received in the opening 95 of the strap 94 is the shank 96 of a T bar. The cross member 97 of said T bar is pivotally attached to the upper face of the cross beam 87. On the shank 96 between the upper end of the strap 94 and the cross member 97 a spring 98 is provided. A cord 99 engaging the upper end of the shank 96 through the ring 100 extends to within reach of an operator seated at the controls of the tractor 20 to provide means for releasing the general latch structure. The balance of the scoop is preferably such that it tends, slightly, to rotate rearwardly. This tendency, however, is overcome by a small load upon the fork situated forward of the axis of rotation. When my front delivery loader is in use, a load having been obtained upon the scoop, said scoop is raised by means of the secondary frame 34 and cables 40 and 48, in the manner heretofore described in connection with the rear delivery loader, to an elevated position such as that shown in dotted lines in Fig. 8. The operator then pulls the cord 99 rotating the shank 96 of the T bar causing the portion 91 of the T hinge 88 to rotate rearwardly by reason of the connection between said portion 91 and said shank 96 through the strap 94. Thus the wedge 93 is drawn to a position to the rear of the angle iron 81 and out of engagement with the top edge of said angle iron whereupon the load upon the scoop rotates said scoop forwardly upon its pivot to a discharge position. When the load has fallen from the scoop, the balance of the scoop rotates it rearwardly until such rotation is halted by engagement of the ends 85 and 86 of the angle iron 81 with the beams 77. As said scoop rotates rearwardly the rear bottom edge engages the inclined forward face of the wedge 93 forcing the portion 91 of the hinge 88 to rotate rearwardly sufficiently to permit the rear structure of the scoop to pass the lower end of the wedge 93. Immediately after the angle iron 81 has passed said wedge 93 the spring 98 operates to rotate the portion 91 forwardly placing the lower end of the wedge 93 in a position above the upper edge of the angle iron 81 whereby forward rotation of the scoop is inhibited. The construction is such that the tolerance or play which the scoop has between its stop for forward rotation and its stop for rearward rotation is not great.

In practicing my novel process of loading in its preferred form I employ a pick-up device mounted upon a vehicle and a receptacle to be loaded normally situated to the rearward of said pickup. The vehicle is moved forwardly to insert the pick-up beneath the material to be loaded. When a desired quantity of said material has been gathered on the pick-up the vehicle is brought to a stop; thereafter the pick-up is moved upwardly and rearwardly and then brought to a halt. After the load has been discharged the pick-up is returned to a position adjacent the horizontal. It is not essential that the pick-up after moving upwardly and rearwardly, be brought to a halt in the sense of being brought to a prolonged standstill. It may be simply a momentary halt or stand-still during change of direction. It is not essential to my process that the vehicle be brought to a stop before relative movement of the pick-up has commenced nor is it inherent that it be brought to a stop at all if the material being loaded is spaced apart or if it is not necessary to pick up all of the material. Clearly, lowering the pick-up is necessary only when the process is to be repeated. If desired, the speed at which the pick-up is raised upwardly and rearwardly may be varied in successive operations in order to distribute the material being loaded.

In carrying out my novel process for stacking, I employ a pick-up mounted upon a vehicle similarly as in my loading process. Also, as in the loading process, the vehicle is moved forward to place it in supporting engagement with the material to be loaded. After an adequate load has been gathered, the vehicle is propelled to a position adjacent the depository and is so set that its end which is opposite that to which the pick-up is most adjacent is proximate the depository. The pick-up is then raised upwardly and rearwardly and subsequently brought to at least a momentary halt. After the load has been discharged, the pick-up may again be lowered to a substantially horizontal position. If desired the pick-up may be moved to some extent relative to the vehicle before the vehicle has been set adjacent the depository.

A large number of modifications, variations, and eliminations may be made in my invention without seriously impairing its success. Some of these I shall enumerate specifically; others will be apparent to those skilled in the art. The mounting of the differential or its substitute, the structure for supporting the rear ends of the beams 21 and 22, and various parts of the intermediate power chain upon the tractor draw bar and the nature of their supporting structure are purely optional. The support for the rear ends of the beams 21 and 22 may itself be varied and may consist of any suitable single or multiple unit construction. Extensions 72, the slip-clutch 53, the transmission 54, the housings 51 and 61 and the power cut-out 66 may all be eliminated. If retained, the safety device 63 may attach to the tractor power take off connections or other suitable structure may be substituted for the cable 67, pulley 69 and lever 68 combination. In case some means other than a transmission is desired for disengaging the tractor gears from the differential 43 during the lowering of the main frame in order to speed up that operation, a straight or spiral jaw clutch coupling may be substituted for the transmission 54 or the tractor pulley wheel may be removed. The beam members of the secondary frame, the pulleys 76, and the segments of the cable 48 have been shown as substantially spaced apart at the top of the secondary frame. The reason for this detail is to enable these members to clear a person sitting on the tractor seat while the device is in operation. If such clearance is not essential or if other means be provided, these elements need not be spaced apart. The term cable as employed herein in connection with the members 48, 48, 65, and 67 is intended to include any suitable type of connecter such for example as chain, rope, wire cable, or heavy single strand wire. 48 may even be rigid if pivotally mounted at its ends. The pick-up in both forms of my invention may be widely varied including change of shape and elimination of teeth. The teeth 29 need not be pivotally mounted upon the teeth 27 and they and the cross bar 28 may be eliminated. The mount for the secondary frame may be altered and the construction of both the primary and secondary frames may be widely varied. The cable 48 may be operatively connected to the secondary frame otherwise than at a single point adjacent the central portion thereof and it may also variously engage the primary frame. The cable 65 may be of a general V shape engaging the main frame at two points and it may be secured rigidly to the tractor or other vehicle on which the device may happen to be mounted thus eliminating the spring or other resilient means 66. Any suitable constructions may be substituted for the drums 41 and 42 and for the drive for these drums, and the drive or drives for these drums may be connected to the power take-off or other suitable power source by any appropriate means. The brake combination 56, 57 and 59 may be eliminated or any other suitable means may be substituted for halting and holding the load in midair; however, the particular device provided is especially desirable because while furnishing substantially no resistance to rotation of the shaft 55 by the power take-off of the tractor, it affords an absolutely positive automatic stop against reverse rotation at any desired point whatsoever, requiring means, such as the cord 57a to be pulled by the operator, to release the tension of the spring 59 on the shoe 57 when the main frame is being lowered. The stub ends 70 and 71 on the beams 21 and 22 are not essential if other means be provided for maintaining the balance of the vehicle. Extensions 72, if used, may be widely varied. If for any reason such be desired, additional auxiliary or secondary frames may be employed. Other stop means may replace the cable 65.

Many of the modifications, variations, and eliminations suggested in connection with the form of my invention shown in Figs. 1 to 7 may be made in corresponding parts in the form shown in Figs. 8 to 11. Any suitable type of scoop may be employed and the most desirable type depends upon the material being handled. The manner in which the scoop is mounted upon the supporting frame structure is immaterial and may be widely varied from that described specifically. Similarly the construction at the rear end of the scoop may be greatly altered or it may be in the main eliminated. Also the stop means for preventing rearward rotation of the scoop and the latch means for optionally regulating forward rotation of the scoop may be of any workable type. While these may be eliminated in the event that a non-rotatable scoop is employed, some devices for accomplishing their purposes will normally be incorporated as a tiltable scoop is highly preferable. The balance of the scoop need not be as described if other means be provided for returning it to operable positions. Also it is in no sense essential that either of the main frame members be formed from two timbers spaced apart at their rear ends as appear in Fig. 8 of the drawings. If a latch of the general type shown be employed, it may engage any suitable member on the scoop; in fact the latch may be mounted on the scoop and engage a stationary member mounted, for example, on the frame structure. The component parts of the latch shown, may be replaced by members adapted to perform their respective functions. If desired the T hinge 88, the ring 100, the T bar including the shank 96 and cross member 97, and spring 98 may be eliminated. If the hinge 88 is eliminated any suitable means may be provided for hingedly mounting the members 93 and 94 and these members may be connected directly to one another or one member may be made to perform the function of both. The design of the member 93 need not be like that shown but said member should provide an inclined face for engagement by the rearwardly rotating scoop unless a registering incline is provided on the scoop itself. The manner in which the member 94 engages the shank 96, if these parts are used, is non-essential. The shank 96 may be stationary if the opening 95 is elongated; the cord 99 then rotates the catch structure directly. As a matter of fact, a piece of spring metal having a protruding lug adapted to engage the top of the angle iron 81 may be installed in the general manner of the hinge 88 and the cord 99, or suitable substitute, attached to the upper end portion thereof. The spring metal holds the lug in operative position except when fixed rearwardly as a result of the operator pulling the cord 99.

In the front delivery form of my invention the main frame has been shown as mounted on the tractor or other vehicle inside of the rear wheels and forward thereof. In the rear delivery form I have shown the main frame as mounted to the rear of the rear wheels and outside of said wheels. The precise positions of such mountings are obviously not essential to a satisfactory functioning of my invention. The positions of mountings in the two forms may be interchanged or they may be varied from either of those shown, for example, non-rotating extensions of the rear wheel axles could be employed. The basic features of my invention are a frame pivotally mounted adjacent one end upon a vehicle adapted to pick up a load with its other end when the same is in a generally horizontal position and means for rotating said frame to raise the extended end thereof. While a rotatable secondary frame and suitable means for connecting said secondary frame to a power source and to the primary frame comprise the construction preferred as the means for rotating said main frame they are in no sense the only satisfactory combination for accomplishing this result. For example, rigidly mounted upright supports carrying rotatable sheaves on their upper ends may be substituted for the secondary frame and power be applied to suitable cables connected to the main frame and riding on said sheaves.

While I have spoken at various times of the ability of my device to load and stack hay, it is obvious that it has a very large number of other applications and uses, both commercial and industrial as well as agrarian. It functions especially acceptably in the loading of grain bundles into racks for threshing. A rack is simply secured behind the tractor on which my device is mounted and the tractor driven down a row of shocks picking up the bundles ahead of it as it goes and depositing them in the rack to the rear.

In the following claims I have referred to my device as a loader for the purpose of brevity but it is my intention that loader as used therein shall include the capacity of my device to serve as a stacker and as a rake and pick-up.

While I have described certain embodiments of my invention and some modifications thereof for illustrative purposes, it is obvious that one skilled in the art will be able to make numerous variations and modifications therein and this without departing from the spirit and scope of my invention. I therefore wish to be limited herein only by the appended claims.

I claim:

1. In a device of the type described, a frame structure including two substantially parallel spaced apart beam members, a second frame structure including two substantially parallel spaced apart beam members and a cross beam connecting an end portion of one of said beams to the corresponding end portion of the other said beam, a power shaft having adjacent each end portion structure adapted to receive wound cable, flexible connecter connecting each latter said structure with the corresponding end portion of the said cross beam, and generally V shaped connecter structure having the spaced apart ends of its legs connected to the spaced apart beams of said first frame and having its vertex connected to said second frame.

2. In a device of the type described including a beam member pivotally mounted adjacent one of its ends, extension means on that end of said beam which is adjacent said pivot comprising an elongated sleeve adapted to slidably engage said beam and to have one of its ends extended therefrom, said sleeve being provided with elongated slot structure, and means extending through said slot structure for selectively holding said sleeve in various positions of extension.

3. In a device of the type described a windlass, a movable primary frame; a secondary frame including pivotally mounted beam members spaced apart but connected at their extended ends, a pulley mounted adjacent the extended end of each of said beam members, a flexible member having its ends attached to said windlass and a portion intermediate its ends operatively engaging said pulleys and a generally V-shaped connecter having its vertex connected to said secondary frame and having the spaced apart ends of its legs operatively connected to transversely spaced apart portions of said primary frame.

4. In a device of the type described including a windlass, an elongated primary frame and a secondary frame, flexible means connecting one side of said windlass with the corresponding side of said secondary frame, flexible means connecting the other side of said windlass with the other side of said secondary frame and generally V-shaped connecter structure having the spaced apart ends of its legs connected to transversely spaced apart portions of said primary frame and having its vertex connected to said secondary frame.

5. In a device of the type described a vehicle, a draw bar pivotally mounted on said vehicle, a primary frame, means for pivotally mounting one end portion of said primary frame upon the generally extended portion of said draw bar in such a manner that the other general end portion of said primary frame may be swung to a position above said vehicle to deliver a load to the rear of said vehicle and means for fixing the position of rotation of said draw bar at any one of a plurality of points whereby the elevation of said end portion of first said frame may be regulated.

6. In a device of the type described, a frame adapted to be mounted upon a vehicle and to rotate relative thereto on pivots disposed to the rear of the rear axle of said vehicle, and portions on said frame extending beyond said pivots adapted to engage the ground when said frame is in a generally vertical position of its rotation whereby rearing of the vehicle is limited.

7. In a device of the type described having a windlass and having also a secondary frame including pivotally mounted beam members spaced apart from one another and connected at their extended ends by a cross beam, a flexible member having at least one of its ends attached to said windlass and a portion spaced from said attached end wrapped about said cross beam whereby when said windlass is operated to rotate said secondary frame through said flexible member said flexible member may unwind in part from about said cross beam thus avoiding abrasive slippage of said flexible member about said cross beam.

8. For a device of the type described including a windlass, elevating mechanism comprising a primary frame which includes a pair of spaced apart beam members pivotally mounted adjacent corresponding ends, load carrying means supported upon the other spaced apart ends of said beam members, a secondary frame which includes spaced apart beam members pivotally mounted adjacent corresponding ends and connected at their free spaced apart ends by a cross beam, a flexible member having its ends disposed to one side of said secondary frame and each operatively connected to said windlass and having its central portion disposed to the other side of said secondary frame, the arrangement being such that portions intermediate said central portion and each of said end portions is wrapped a plurality of times about the respectively adjacent end portions of the said cross beam of the secondary frame, and a flexible member having its end portions attached at least indirectly to those general end portions of the beams of the primary frame which support the said load carrying means and having its central portion attached to the central portion of said first flexible member, said flexible members approaching one another in the shapes of modified V's, the function of the wrapping of the first mentioned flexible member about the cross beam being to eliminate slippage of said flexible member about said cross beam due either to change in the relative positions of said cross beam and said windlass or of said cross beam and said load carrying means bearing end portions of said primary frame beams.

9. For a device of the type described including a power source, elevating means comprising a pivotally mounted primary frame, a secondary frame including a pair of spaced apart beam members pivotally mounted adjacent corresponding ends and connected at their spaced apart free ends by a cross beam, means for operatively connecting said power source to each of the end portions of said cross beam and means for communicating motion of said secondary frame to portions of said primary frame which are substantially spaced apart transversely, said latter means converging adjacent said cross beam and being connected thereto, the juncture of said connection being disposed between parallel planes passing through the junctures at which said power source is operatively connected to said cross beam.

STEPHEN S. POKORNY.

REFERENCES CITED

The following references are of record in the file of this patent:

UNITED STATES PATENTS

| Number | Name | Date |
|---|---|---|
| 1,187,742 | Johnson | June 20, 1916 |
| 1,703,600 | Sell | Feb. 26, 1929 |
| 1,439,948 | Cole et al. | Dec. 26, 1922 |
| 2,246,083 | Weber | June 17, 1941 |
| 781,166 | Scott et al. | Jan. 31, 1905 |
| 2,242,860 | Huelle | May 20, 1941 |
| 2,276,483 | Hahn | Mar. 17, 1942 |
| 2,195,007 | Johnson et al. | Mar. 26, 1940 |
| 2,311,523 | Cope et al. | Feb. 16, 1943 |
| 2,019,938 | Stephens | Nov. 5, 1935 |
| 791,196 | Jenkins et al. | May 30, 1905 |
| 1,773,302 | Cope | Aug. 19, 1930 |
| 993,546 | Pearson | May 30, 1911 |
| 1,182,436 | Vroom | May 9, 1916 |
| 1,621,448 | Zilbersher | Mar. 15, 1927 |
| 1,476,857 | Tuttle | Dec. 11, 1923 |
| 944,263 | Hagadone | Dec. 28, 1909 |
| 2,214,427 | Miller | Sept. 10, 1940 |
| 2,109,440 | Villerup | Feb. 22, 1938 |
| 2,322,487 | Toftey | June 22, 1943 |